United States Patent
Hochgesang et al.

(10) Patent No.: US 7,311,819 B2
(45) Date of Patent: Dec. 25, 2007

(54) AQUARIUM FILTER

(76) Inventors: Bradley Earl Hochgesang, 890 2nd Ave., Jasper, IN (US) 47546; Andrew Kent Hochgesang, 890 2nd Ave., Jasper, IN (US) 47546

( * ) Notice: Subject to any disclaimer, the term of this patent is extended or adjusted under 35 U.S.C. 154(b) by 119 days.

(21) Appl. No.: 10/988,648

(22) Filed: Nov. 15, 2004

(65) Prior Publication Data

US 2006/0102536 A1    May 18, 2006

(51) Int. Cl.
*A01K 63/04* (2006.01)
(52) U.S. Cl. ............ 210/151; 210/167.22; 210/167.25; 210/262; 210/416.2; 210/905; 119/260
(58) Field of Classification Search ................ 210/150, 210/151, 169, 263, 282, 416.1, 416.2, 905, 210/167.21, 167.22, 167.25, 167.27; 119/248, 119/259, 260
See application file for complete search history.

(56) References Cited

U.S. PATENT DOCUMENTS

| | | | | |
|---|---|---|---|---|
| 4,246,114 A | * | 1/1981 | Krebs et al. ................ | 210/151 |
| 4,396,507 A | * | 8/1983 | Grant ......................... | 210/150 |
| 4,844,013 A | * | 7/1989 | de Haan et al. ............ | 119/248 |
| 4,863,594 A | * | 9/1989 | Pedretti ...................... | 210/169 |
| 4,915,828 A | * | 4/1990 | Meyers et al. .............. | 210/110 |
| 4,988,436 A | * | 1/1991 | Cole ........................... | 210/169 |
| 5,084,164 A | * | 1/1992 | Del Rosario ................ | 210/94 |
| 5,306,421 A | * | 4/1994 | Weinstein ................... | 210/151 |
| 5,628,905 A | * | 5/1997 | Montalbano ................ | 210/615 |
| 5,667,671 A | * | 9/1997 | Munsch et al. ............. | 210/151 |
| 5,965,016 A | * | 10/1999 | Suchowski et al. ........ | 210/169 |
| 6,869,530 B1 | * | 3/2005 | Venezia ...................... | 210/221.2 |
| 7,094,335 B2 | * | 8/2006 | Patron ......................... | 210/151 |

FOREIGN PATENT DOCUMENTS

JP      11-262344      * 9/1999

* cited by examiner

*Primary Examiner*—Fred G. Prince
(74) *Attorney, Agent, or Firm*—Kerri A. Hochgesang

(57) ABSTRACT

The present invention is an aquarium filter that treats water mechanically, chemically and biologically, provides maximum and uniform circulation and aeration of water, prevents channeling, reduces surface debris, reduces leaking and clogging, maximizes the viewable area, facilitates a slim profile, while being uncomplicated to install and inexpensive. In an exemplary embodiment, the present invention is an aquarium filter comprising a first surface skimmer, a second surface skimmer, a first mechanical filter, a second mechanical filter, a plurality of drip trays, a plurality of biological filters, a first chemical filter, a second chemical filter, a pump and a conduit.

3 Claims, 2 Drawing Sheets

AQUARIUM FILTER

CROSS REFERENCE TO RELATED APPLICATIONS

This application is related to, and incorporates by reference, U.S. patent application having Ser. No. 10/988,649, and entitled "AQUARIUM" which is filed concurrently herewith and is assigned to the same assignee.

TECHNICAL FIELD

The present invention relates to aquarium filters and, more particularly to a wet/dry filter that provides filtration, aeration, and buffering, of the water while maximizing the usable area of the aquarium.

BACKGROUND OF THE INVENTION

Filters have been used in aquariums for many years to remove particulate matter from the aquarium water in order to keep the aquarium clean. Traditionally, the most common type of aquarium filter is a power filter which hangs on the outside of the aquarium over the top edge thereof It includes a siphon tube which carries water from the aquarium into the filter box which is located on the outside of the tank. Water entering the filter box flows over various types of filter media to remove particulate matter from the water. The water passes through the filter media to remove chemical impurities and particulate matter from the water which is then pumped back into the aquarium using a filter pump. Typically, the water that is pumped back into the tank is no more than a few inches from the siphon tube that carries he water into the filter, causing 'dead' spots in the aquarium where water can stagnate. Further, power filters typically allow debris to collect at the bottom of the aquarium. Examples of such power filters include the Supreme Aqua King power filter marketed by E. G. Danner Manufacturing Co.; the Second Nature Whisper power filter marketed by Willinger Bros. Mfg. Co.; and the Aqua Clear power filter marketed by Rolf Hagen Manufacturing Co.

Another type of aquarium filter hereto used is a canister type filter which is positioned outside and usually below the aquarium. Intake and output hoses hang over the aquarium edge and are connected to the canister filter on the floor. Water is fed by gravity through the intake hose from the aquarium to the canister. The aquarium water is treated mechanically, chemically, and biologically and pumped back into the aquarium by a pump contained in the canister. Canister filters are designed to be a sealed system and the filter and hoses alike must remain water-tight to prevent leaks. Being a closed system, the biological media is completely submersed and may only be aerated through the use of a bubbler added to the water intake. Further, cleaning requires the disassembly and reassembly of the filter. Similar to the power filter, the canister filter typically allows debris to collect at the bottom of the aquarium. Examples of canister type filters include the Hagen Fluval filter marketed by Hagen USA Mfg., Co.; and Marine Land canister filter marketed by Aquaria, Inc.

An internally mounted power filter is still another type of aquarium filter. Such filters comprise a small canister with a built-in pump which is submerged inside the aquarium. Water enters the bottom of the canister and flows through a filter sleeve which removes particulate and chemical waste. The filtered water is then pumped out the top of the canister and back into the aquarium. An internally mounted power filter requires either an air hose or a power cord inserted into the tank and the filter must be completely removed for maintenance. Similar to the canister type filter, the internally mounted power filter incorporates a completely submersed biological media and may only be aerated through the use of a bubbler added to the water intake. Similar to the power filter, the internally mounted power filter typically causes 'dead' spots in the aquarium where water can stagnate. Also similar to the power filter, the internally mounted power filter typically allows debris to collect at the bottom of the aquarium. Examples of this type of filter are the Supreme Ovation internal filter marketed by Danner Mfg. and the Hagen Fluval internal filter sold by Hagen USA Mfg. Co.

Still another type of filter employed in aquariums is the undergravel filter which consists of a perforated raised plate which rests on the aquarium floor. Riser tubes are provided on either end of the filter and extend into the top of the aquarium. Gravel is placed on top of the plate to a thickness of about 2". Air lines from an external pump are placed in the riser tubes to the bottom plate and an air stone is placed at the end of the air lines. Air is forced by the pump to the air stones thereby forcing air bubbles to travel up through the tubes to the water surface creating turbulence or current. Water is then pulled through the gravel and forced up the riser tubes. Alternatively, a pump may be placed on top of the riser tube to force water into, or pull water from the tube. Chemical or mechanical pre or post-filters may be used. Waste from the aquarium is drawn through the gravel bed where bacteria break down any ammonia or nitrites to less harmful nitrates. Typically, in an undergravel filter that pulls water through riser tubes, the aquarium gravel itself becomes a mechanical filter, trapping debris which then must be regularly maintained. Further, in an undergravel filter, a large portion of the aquarium is occupied with air-stones, air hoses, pumps, pre-filters, power cords and riser tubes. Additionally, the surface area of the substrate in an undergravel filter can cause 'dead' spots in the aquarium where water can stagnate. Examples of such undergravel filters include filters marketed by Perfecto Mfg. and Penplex Mfg.

Yet another type of filter commonly used in aquariums is a wet/dry trickle type filter which includes a skimmer box or tube that is placed inside the aquarium at the surface of the water. Siphon tubes are provided for carrying water from the aquarium to a pre-filter which is typically mounted directly behind the skimmer box on the outside of the aquarium. Water passes through the pre-filter to trap particulate matter. The water then travels through the hose into a tank typically positioned beneath the aquarium. As water enters the tank beneath the aquarium, it flows onto a drip plate or spray bar in a dry chamber of filters which contains a high surface area media suitable for bacterial colonization. Water drips over and through the media to the bottom section of the tank. Bacteria colonies grow on the media, which feed on waste products in the water passing over them. From there, the water gathers in the bottom of the filter tank and then passes through a carbon filter or other filter to remove chemical wastes from the water. The water is then pumped through the return hose back to the aquarium. Wet/dry filters can include mechanical, chemical and biological filters. Wet/dry trickle type filters require external hosing that must remain water-tight to prevent leaks. Further, wet/dry trickle type filters that utilize a siphon box must be regularly maintained to prevent siphon loss, which may overflow the aquarium. Similar to the power filter, the wet/dry trickle type filter typically causes 'dead' spots in the aquarium where water can stagnate. Also similar to the power filter, the wet/dry trickle type filter typically allows debris to collect at the bottom of the aquarium. Examples of such filters in the Plus Series trickle filter marketed by Oceanic System, Inc. and the Perfecto Wet/Dry filtration system sold by Perfecto Mfg. Co.

Wet/dry filters may also be built into the aquarium and form a permanent part of the tank. One such wet/dry filter that is permanently built into the tank is marketed by Tenecor Corporation of Tempe, Ariz.

An alternative form of the wet/dry filter is an internally mounted wet/dry filter which includes an integrated pump and heater for small aquariums. The filter is placed inside the aquarium against the rear wall with the top of the filter at the water level. Water enters the filter and then passes through the filter cartridge which removes particulate and chemical waste materials. A portion of the water is then pumped into a drip plate in a dry chamber for biological filtration. The remaining water is then pumped directly back into the aquarium so as to bypass the dry area. Typically, with an internally mounted wet/dry filter, less than 100% of the water exhausted from the filter is biologically filtered. Further, cleaning requires the disassembly and reassembly of the filter. Similar to the power filter, the internally mounted wet/dry filter typically allows debris to collect at the bottom of the aquarium. One such filter is marketed by Rolf Hagen Mfg. under the trademark "Biolife" filter.

Yet another type of internally mounted wet/dry filter is the Simplicity Plus by Tenecor Corporation. The filter is also placed inside the aquarium against the rear wall with the top of the filter at the water level. This filter includes a chamber for a protein skimmer, heater chamber, sump level adjuster, fresh air injection fittings, mechanical and chemical chambers. With this type of wet/dry filter, visibility through the tank is impaired due to the rear-mounting of the filter. Similar to the power filter, this type of wet/dry filter typically causes 'dead' spots in the aquarium where water can stagnate. Also similar to the power filter, this type of wet/dry filter typically allows debris to collect at the bottom of the aquarium.

With the exception of the wet/dry filters, none of the filters here perform biological filtration to a modicum of efficiency. Most filters cause 'dead' spots in the aquarium where water can stagnate, allow debris to collect at the bottom of the aquarium, are difficult to maintain and are unsightly.

Though the wet/dry filters are somewhat efficient at biological filtration, most create a channeling effect which causes both inefficient water circulation and inefficient biological filtering of the water. Also, most wet/dry filters are complicated to install, are expensive and have involved maintenance requirements. They are also prone to leakage and clogging since the water is removed and then pumped back through the hoses. Additionally, most take up space outside of the aquarium or prevent adequate visibility through the tank.

Moreover, the internally mounted filters have a limited capacity. They do not buffer or completely filter all of the water entering the biological section. The entire filter may have to be removed for maintenance. The biological area uses ceramic blocks for bacteria beds which also create a channeling effect and tend to clog and must be replaced. Moreover, since the water entering the filter comes from the bottom of the filter, they do not skim the surface of the water. Further, though the Simplicity Plus can handle larger aquariums, they are very bulky, taking up a large portion of the living area of the aquarium and viewing through the aquarium is impaired by the rear-mounted filter design.

What is needed, therefore, is a filter that treats the water mechanically, chemically and biologically, provides maximum and uniform circulation and aeration of water, prevents channeling, reduces surface debris, reduces leaking and clogging, maximizes the view able area, facilitates a slim profile, while being uncomplicated to install and inexpensive.

SUMMARY OF THE INVENTION

In general, the present invention can be described as a novel aquarium filter. More specifically, the present invention is an aquarium filter that treats water mechanically, chemically and biologically, provides maximum and uniform circulation and aeration of water, prevents channeling, reduces surface debris, reduces leaking and clogging, maximizes the view able area, facilitates a slim profile, while being uncomplicated to install and inexpensive.

In operation, water is introduced into the present invention by pumping water into the living area of the aquarium from the present invention, thus raising the water level in the living area. The water level is raised above at least one threshold causing the water to cascade over the at least one threshold in a manner similar to the way water flows over a spillway, acting as a surface skimmer. This surface skimming action removes proteins and other undesirable substances that get caught in the surface tension of the water. The water then flows through at least one mechanical filter that removes non-dissolved particles from the water. The water then flows through a plurality of holes located in at least one drip tray. The at least one drip tray uniformly distributes the water over a plurality of biomedia material. After the water flows over the plurality of biomedia material, it is directed from the present invention to the living area of the aquarium. The water may either be directed into the living area, or in an exemplary embodiment of the present invention, may be directed through gravel placed into the bottom of the living area.

Surface Skimmer

One aspect of the present invention is at least one surface skimmer. The surface skimmer is formed when the water level is raised above a threshold causing the water to cascade over the threshold in a manner similar to the way water flows over a spillway. One advantage of the present invention is that the surface skimmer traps and removes proteins and debris caught in the surface tension of the water. Another advantage of the present invention is that the surface skimmer pulls water from the surface of the tank, which has had direct exposure to oxygen, thus providing more oxygen for aquatic life and beneficial microbes.

Mechanical

In one embodiment of the present invention, at least one mechanical filter is utilized. The at least one mechanical filter may be located in any portion of the present invention. In an exemplary embodiment of the present invention, the at least one mechanical filter receives and filters water after passing over the surface skimmer but before flowing onto the drip plate. The at least one mechanical filter may be comprised of felt or other suitable material known in the art used to mechanical filter un-dissolved debris. In another exemplary embodiment of the present invention, a plurality of mechanical filters may be placed in multiple portions of the present invention.

Drip Tray

Another aspect of the present invention is a drip tray. In an exemplary embodiment, at least one drip tray is mounted substantially horizontal to the base of the aquarium. The drip tray comprises a plurality of holes randomly located as to facilitate even flow of water through the drip tray. In an exemplary embodiment, the size of the plurality of holes may be of a diameter to facilitate a constant drip while pooling water on the surface of the drip tray. The pooling of the water may be just enough as to cover the drip tray surface, however not enough to raise the level of the pooled water on the drip tray surface. In an exemplary embodiment, a plurality of drip trays may be placed substantially parallel to each other as to create a plurality of drip tray layers. Each of these drip tray layers may be in communication with biomedia material.

One advantage of the present invention in pooling the water on the drip tray before allowing the water to drip onto the biomedia material is to prevent a channeling effect of the water over the biomedia material. A channeling effect forms when water forms a pathway or channel where the water flows more readily than any other area or pathway. Channeling is considered to be unfavorable since the water does not circulate over the entire area of a surface and wears a channel only in one area. This effect can cause, for example, one particular area of biomedia to be worn out faster and need to be cleaned or replaced before other areas of biomedia. This effect can also cause disruptions to the delicate environment of living areas of the aquarium. The pooling allows the water to evenly disperse through all of the plurality of holes in the drip tray and then over the biomedia material, thus eliminating a channeling effect of the water. Another advantage of the present invention is that the biomedia material does not need to be replaced or maintained as often due to a channeling effect, this is explained in more detail below.

Biological Filtering

Another aspect of the present invention is the biological filtering. In an exemplary embodiment of the present invention, biomedia material is in communication with and extends below the drip tray. In another exemplary embodiment of the present invention, the biomedia material comprises of a plurality of substantially perpendicular surfaces that extend substantially to the drip tray below, while still allowing flow through and pooling of water of the drip tray surfaces. One advantage to having a plurality of biomedia material is to increase the surface area and thus, increasing the filtering capability. In an exemplary embodiment of the present invention, the shape of the biomedia material may be conical, cylindrical, pyramidal, elongated, cubical, tear dropped, or any other sufficient shape as to facilitate the flow of water over the surface area of the material. In another exemplary embodiment of the present invention, the biomedia material is infinitely cross-sectioned into smaller sections as to facilitate the greatest amount of surface area possible. The biomeia material can be any material that removes biological waste including, but not limited to, materials that are known in the art.

Another advantage of the configuration and shape of the biological media is that it further prevents a channeling effect. Typically, a channeling effect in biomedia material prevents water from flowing over all portions of biomedia material evenly, thus, making the biological filtration inefficient. When typical biomedia material is stacked on top of each other, which is required to sustain aquatic life, the material becomes less effective as the chamber becomes taller because the effect of channeling becomes more pronounced as the water has more time to gather. Thus, with existing biomedia material, channeling is noticeable when the material is stacked at only a couple of inches tall.

However, in the present invention, the configuration and shape of the biomedia material allows substantially infinite (in height) stacking of the material with no significant channeling effects. Because of the configuration and shape of the biological media in the present invention, water channeling is eliminated and efficiency is not reduced by vertical height.

In another exemplary embodiment of the present invention, the biomedia material is separated into a plurality of sections that may be removable. In another exemplary embodiment of the present invention, the plurality of removable sections may be a plurality of removable containers. Each of the plurality of sections may be confined by at least one of the plurality of drip trays at one end and by at least one of the plurality of drip trays at the other end. Preferably, at least one of the plurality of sections will extend downwardly and perpendicularly from at least one of the plurality of drip trays and substantially extending to at least another one of the plurality of drip trays. In an exemplary embodiment of the present invention, the number of the plurality of sections may be defined as a fraction of the total surface area of the biological media so that one of the plurality of the sections may be removed with little or no impact to the health of the aquatic environment. An advantage of the present invention is that if maintenance is required one or more, but not all, of the biomedia sections or containers may be removed and cleaned without having to remove the entire biomedia material. After cleaning the biomedia section, the clean section may be returned to the present invention or, alternatively, a new cartridge may be inserted in its place.

In an alternative exemplary embodiment of the present invention, the mechanical and chemical filtration material may be separated into a plurality of sections that may be removable. In an exemplary embodiment, the plurality of mechanical and chemical sections may be interchangeable with the plurality of biological sections. The interchangeability will provide a customizable balance of mechanical, chemical and biological filtration. For example, in an aquarium with a small amount of aquatic live, the number of biological sections could be decreased and the number of mechanical and chemical sections could be increased to decrease the amount of maintenance required. Moreover, in an aquarium with a large amount of aquatic life, the number of biological sections could be increased and the number of mechanical and chemical sections could be decreased to provide adequate removal of aquatic waste.

Chemical Filtering

In an exemplary embodiment of the present invention, at least one chemical filter is utilized. The at least one chemical filter may be located in any portion of the present invention. In an exemplary embodiment of the present invention, the at least one chemical filter receives and filters water after passing through the biomedia material but before being directed out of the present invention. The at least one chemical filter may be comprised of ammonia, nitrite, nitrate removers, detoxifiers, activated carbon, charcoal or other suitable material known in the art used to chemically filter water. In another exemplary embodiment of the present invention, a plurality of chemical filters may be placed in multiple portions of the present invention.

Upward Water Flow

Yet another aspect of the present invention is the upward flow of water into the living area of the aquarium. In an exemplary embodiment of the present invention, post-filtered or "filtered" water is directed through top surface of the aquarium and toward the surface skimmer. In one exemplary embodiment of the present invention, the water leaving the biological filter is directed through the conduit. In an alternate exemplary embodiment, the water leaving the chemical filter is directed through the conduit. One advantage of the upward water flow is the continuous and level circulation of debris in the living area toward the surface of the aquarium and eventually into the surface skimmer. This continuous and level upward flow reduces the mixing of newly filtered water with the water in the living area of the aquarium, and, in turn, reduces the amount of time to completely circulate the water into the filter. In an exemplary embodiment of the present invention, the pump directs the filtered water through a conduit located at or near the bottom of the aquarium toward the top of the aquarium and toward the surface skimmer. Another further advantage of the present invention is realized in aquariums that utilize gravel. In an exemplary embodiment of the present invention, water is pumped upward through gravel located on the bottom surface of the living area. Commonly, gravel is used in the bottom of aquariums for both aesthetic reasons and maintenance purposes. The gravel serves as a trap, catching debris in the cracks and crevices thus, keeping the aquarium cleaner in appearance. However, cleaning the debris from the gravel can be difficult. Most fish hobbyists use a siphon to clean fish tank gravel. The siphon removes water from the tank, carrying the debris in the gravel with it. After an amount of water is removed from the tank (usually 10-30 percent) it is dumped, and fresh water is returned to the tank. In the case of salt water tanks, salt water is returned to the tank, and the salinity is adjusted. One advantage of the present invention is that the debris is continually cleaned and circulated toward the surface skimmer. This also provides more living area for nitrifying bacteria, thus filtering the water further. Another advantage of the present invention is the elimination of the need to regularly clean the gravel by siphoning the aquarium.

Plurality of Chambers

In an exemplary embodiment of the present invention, a plurality of chambers may be incorporated. In one embodiment of the present invention, each of the plurality of chambers may comprise of any combination of a plurality of surface skimmers, a plurality of drip plates, a plurality of biomedia material, a plurality of mechanical filter material and a plurality of chemical filter material. In an exemplary embodiment of the present invention, each of the plurality of surface skimmers may be used for each of the plurality of chambers. In another exemplary embodiment of the present invention, the plurality of chambers are substantially parallel to each other.

In operation, water is introduced into the present invention by pumping water into the living area of the aquarium from the present invention, thus raising the water level in the living area. The water level is raised above at least one threshold causing the water to cascade over the at least one threshold in a manner similar to the way water flows over a spillway, acting as a surface skimmer. The water then flows through each of the plurality of chambers. In an exemplary embodiment of the present invention, each chamber has at least one mechanical filter that removes non-dissolved particles from the water. The water then flows through a plurality of holes located in at least one drip tray in each of the plurality of chambers. The at least one drip tray uniformly distributes the water over a plurality of biomedia material. After the water flows over the plurality of biomedia material, it is directed from each of the plurality of chambers to the living area of the aquarium.

BRIEF DESCRIPTION OF THE DRAWINGS

Other aspects, advantages and novel features of the invention will become more apparent from the following detailed description of exemplary embodiments of the invention when considered in conjunction with the accompanying drawings wherein.

DETAILED DESCRIPTION

In general, the present invention can be described as a novel aquarium filter that treats water mechanically, chemically and biologically, provides maximum and uniform circulation and aeration of water, prevents channeling, reduces surface debris, reduces leaking and clogging, maximizes the view able area, facilitates a slim profile, while being uncomplicated to install and inexpensive.

Referring now to the figures, in which like numerals refer to like elements throughout the several views, exemplary embodiments of the present invention are described.

Figure 1:
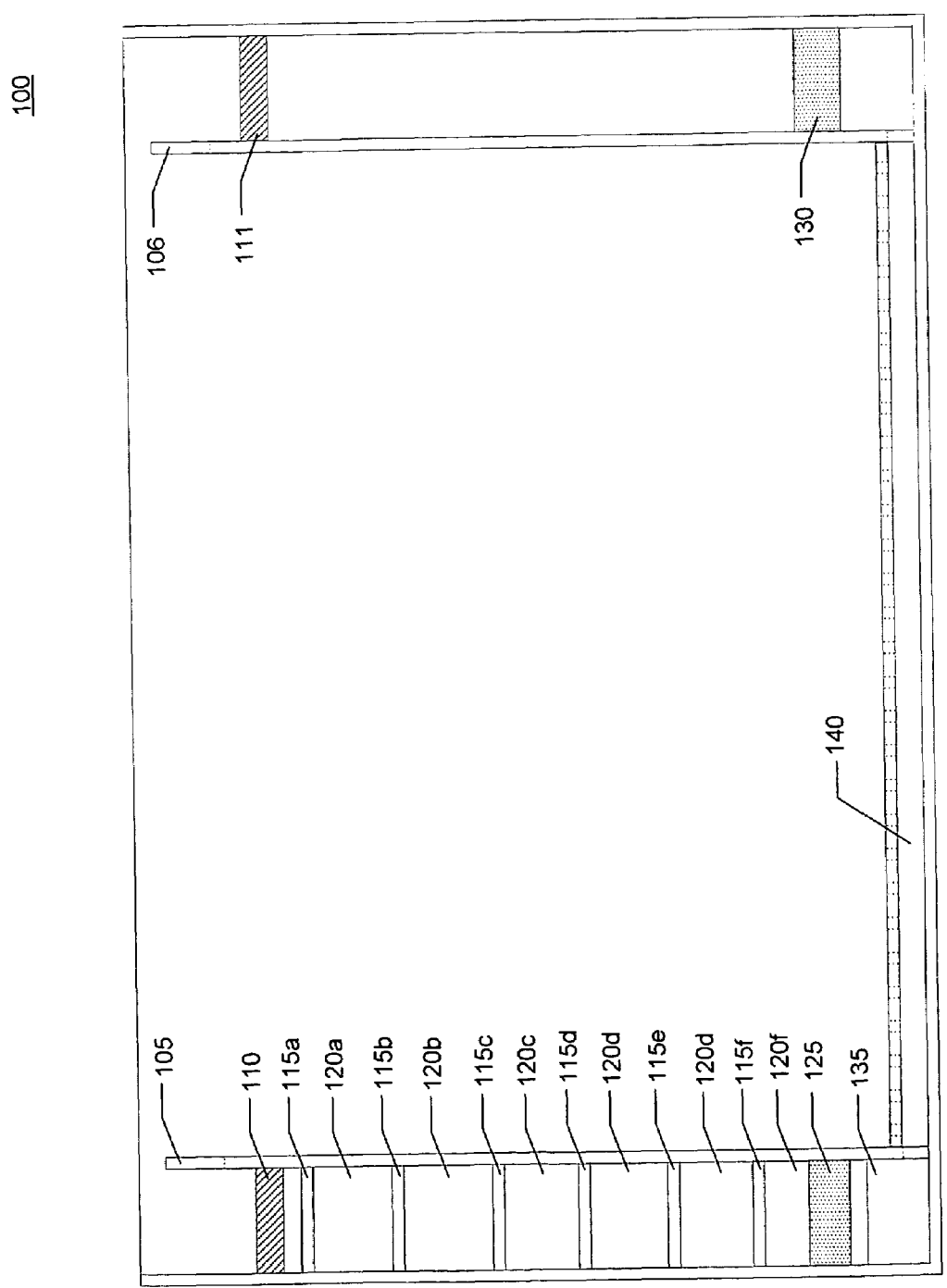
FIG. 1 is a schematic view illustrating an aquarium filter according to the present invention.
Figure 2:
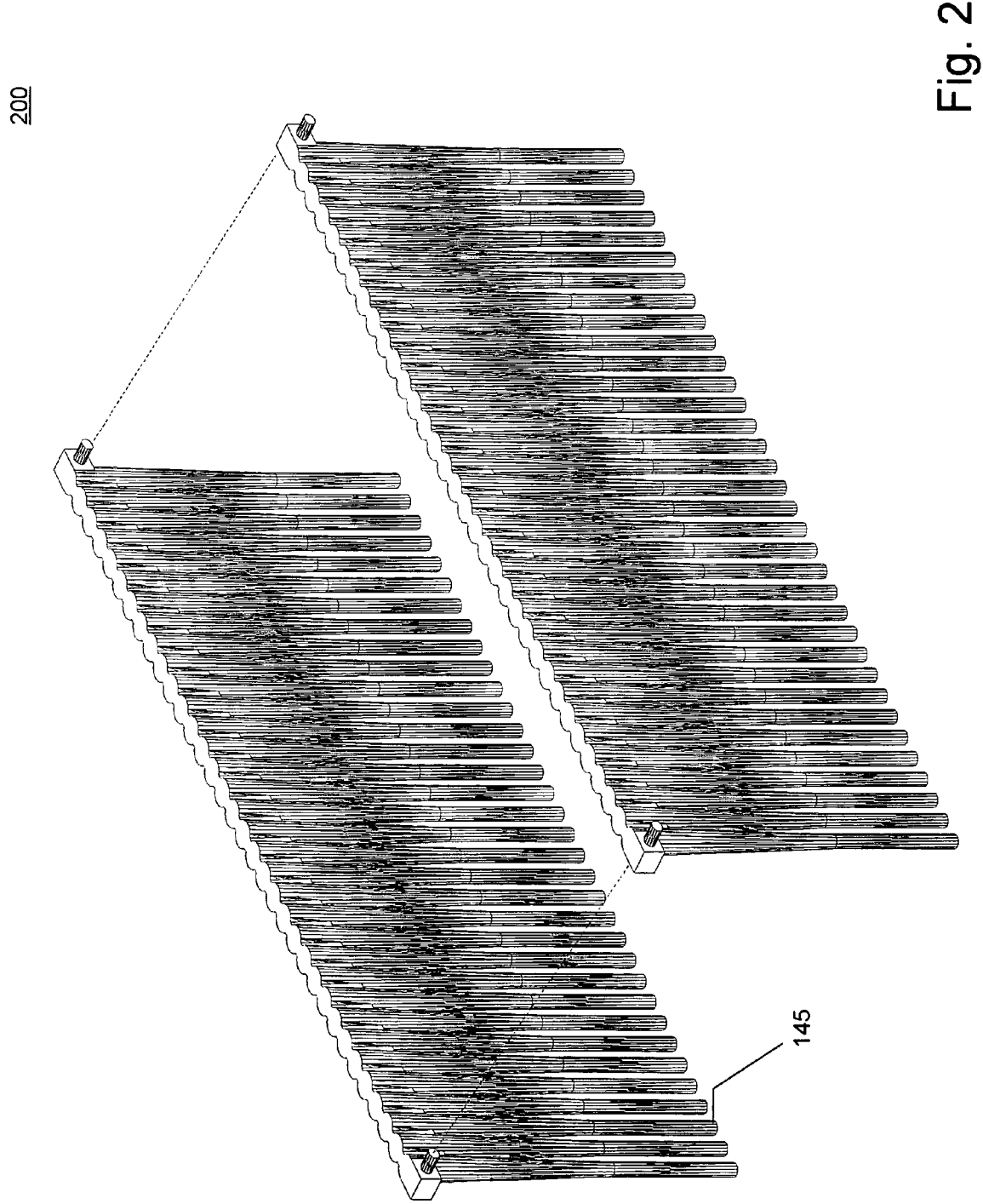
FIG. 2 is a detailed view illustrating a biological filter according to the present invention.

In conjunction with FIGS. 1 & 2, exemplary embodiments of the present invention are depicted by an aquarium filter 100 comprising a first surface skimmer 105, a second surface skimmer 106, a first mechanical filter 110, a second mechanical filter 111, a plurality of drip trays 115a-f, a plurality of biological filters 120a-f, a first chemical filter 125, a second chemical filter 130, a pump 135 and a conduit 140.

The first surface skimmer 105 traps and removes protein and debris from the water. The first mechanical filter 110 is in fluid communication with the first surface skimmer 105 and removes non-dissolved debris from the water. The second surface skimmer 106 is substantially parallel to the first surface skimmer 105. The second surface skimmer 106 traps and removes protein and debris from the water. The second mechanical filter 111 is in fluid communication with the second surface skimmer 106 and also removes non-dissolved debris from the water.

One of the plurality of drip trays 115a is in fluid communication with the first mechanical filter 110. Each of the plurality of drip trays 115a-f have a plurality of holes for pooling water on the drip trays 115a-f surface to facilitate a constant and even distribution of water through the plurality of drip trays 115a-f Each of the plurality of biological filters 120a-f, are in fluid communication with at least one of the plurality of drip trays 115a-f for mixing air with the water and cultivating nitrifying bacteria in the water.

The first chemical filter 125 is in fluid communication with one of the plurality of biological filters 120c for removing ammonia from said water. The second chemical filter 130 is substantially parallel to the first chemical filter 125. The pump 135 is in fluid communication with the first chemical filter 125 and in fluid communication with a conduit 140 for directing water toward the first and second surface skimmers 105 & 106.

In conjunction with FIG. 2, one of the plurality of biological filters 120a-f is depicted 200. Said biological filter 200 is comprised of a plurality of biomedia material 145 that are conical in shape. Said plurality of biomedia material 145 provide an even, non-channeling mixture of air and water that facilitates the growth of bacteria. In an exemplary embodiment of the present invention, said plurality of biomedia material 145 may be attached and/or removed to at least another plurality of biomedia material 145. Said plurality of biomedia material may also be arranged into a plurality of removable sections 150.

One skilled in the art will appreciate that the application of the present invention can take many forms and functions and the examples provided herein are only used to illustrate a few of these possibilities. The scope of the present invention is not limited by these examples.

Although this disclosure describes the invention in terms of exemplary embodiments, the invention is not limited to those embodiments. Rather, a person skilled in the art will construe the appended claims broadly, to include other variants and embodiments of the invention, which those skilled in the art may make or use without departing from the scope and range of equivalents of the invention.

What is claimed is:

1. An aquarium filter system providing filtered water to an aquarium, the system comprising:
    a first surface skimmer for trapping and removing protein and debris from water;
    a first mechanical filter in fluid communication with said first surface skimmer for removing non-dissolved debris from said water;
    a second surface skimmer for trapping and removing protein and debris from water, said second surface skimmer is substantially parallel to said first surface skimmer;
    a second mechanical filter in fluid communication with said second surface skimmer for removing non-dissolved debris from said water;
    a plurality of drip trays, at least one of said plurality of drip trays in fluid communication with said first mechanical filter and at least one of said plurality of drip trays in fluid communication with said second mechanical filter, said drip trays having a plurality of holes for pooling said water on said drip trays to facilitate a constant and even distribution of said water through said drip trays;
    a plurality of biological filters, each of said plurality of biological filters in fluid communication with at least one of said plurality of drip trays for mixing air with said water and cultivating nitrifying bacteria in said water;
    a plurality of chambers, each of said plurality of chambers containing at least one of said plurality of biological filters and in fluid communication with at least one of said plurality of drip trays, said plurality of chambers facilitating flow of said water through said chamber;
    a first chemical filter in fluid communication with at least one of said plurality of biological filters for removing ammonia from said water;
    a second chemical filter in fluid communication with at least one of said plurality of biological filters for removing ammonia from said water, said second chemical filter is substantially parallel to said first chemical filter; and
    at least one pump in fluid communication with said first chemical filter and in fluid communication with a conduit for directing said water toward said first and second surface skimmers.

2. The aquarium filter of claim 1, wherein each of said plurality of chambers further comprise at least one of said plurality of drip trays within said chambers.

3. The aquarium filter of claim 2, wherein said conduit comprises a plurality of holes that direct water in an upward direction toward said first and second surface skimmers.

* * * * *